(12) United States Patent
Gilchrist (10) Patent No.: US 8,736,095 B2
(45) Date of Patent: May 27, 2014

(54) ELONGATED HYDROPOWER GENERATION EMPLOYING LINEAR ELECTRIC GENERATION

(75) Inventor: Aaron Davis Gilchrist, Logan, UT (US)

(73) Assignee: Aaron Davis Gilchrist, Nibley, UT (US)

( * ) Notice: Subject to any disclaimer, the term of this patent is extended or adjusted under 35 U.S.C. 154(b) by 219 days.

(21) Appl. No.: 13/358,111

(22) Filed: Jan. 25, 2012

(65) Prior Publication Data

US 2013/0187387 A1    Jul. 25, 2013

(51) Int. Cl.
*F03B 13/00* (2006.01)

(52) U.S. Cl.
USPC .................................. 290/54; 290/43

(58) Field of Classification Search
USPC .................................... 290/43, 54
See application file for complete search history.

(56) References Cited

U.S. PATENT DOCUMENTS

| | | | | | |
|---|---|---|---|---|---|
| 3,927,330 | A | * | 12/1975 | Skorupinski | 290/54 |
| 4,053,253 | A | * | 10/1977 | Coffer | 415/5 |
| 5,684,335 | A | * | 11/1997 | Ou | 290/54 |
| 5,758,911 | A | * | 6/1998 | Gerhardt | 290/55 |
| 7,744,309 | B2 | * | 6/2010 | Lee et al. | 405/75 |
| 2011/0062715 | A1 | * | 3/2011 | Dimaggio | 290/54 |
| 2012/0313376 | A1 | * | 12/2012 | Browning, Jr. | 290/54 |

* cited by examiner

*Primary Examiner* — Tho D Ta (57) ABSTRACT

A linear hydro-kinetic power generation system generates electrical power from low head water, such as rivers or irrigation channels. The linear hydro-kinetic power generation system includes a paddle system configured to travel in a continuous loop when acted upon by the low-head water. The linear hydro-kinetic power generation system also includes a linear electric power generation subsystem configured to generate electricity as the paddles travel along the continuous loop.

8 Claims, 6 Drawing Sheets

ELONGATED HYDROPOWER GENERATION EMPLOYING LINEAR ELECTRIC GENERATION

CROSS REFERENCE TO A RELATED APPLICATION

This application claims benefit of and is based upon U.S. provisional application No. 61/436.532 filed 26 Jan. 2011.

BACKGROUND OF THE INVENTION

1. The Field of the Invention

Implementations of the present invention relate generally to the generation of power using flowing water.

2. Discussion of the Relevant Art

Hydropower is the production of electrical or mechanical power using the force of falling or flowing water. Hydropower is one of the most widely used forms of renewable energy. Often power is converted to electricity and distributed to users on an electrical grid. Advantages of hydroelectric power include: no direct waste, no intermittency of provided power, no fuel costs, and considerably lower output levels of pollutants and greenhouse gases like carbon dioxide ($CO_2$) than fossil fuel powered energy plants.

Traditionally large dams have been constructed in order to implement hydroelectric power. The dam serves to organize the flowing water and increase the pressure or head for use in a hydroelectric turbine. Unfortunately, dams and associated reservoirs submerge land upstream of the dams. The submersion land can destroy biologically productive riparian habitats like riverine valley forests, marshland, and grasslands. The loss of land is compounded by habitat fragmentation. Further, large dams can become a hazard with the potential to inflict tremendous damage and loss of life should the dam ever fail.

Increasingly, nations are preventing the construction of new dams and seeking power capture in low head situations like canals, tidal flows, small dams, or natural river flows. In low head situations the pressure is low and power must be extracted from the natural velocity or kinetic energy of the water. Unlike with high head situations, the maximum possible extractible power in low head situations is often too low to justify costly turbine blades. Despite the need for systems that can generate power using low head situations, many attempts have proven impractical or too costly.

BRIEF SUMMARY OF THE INVENTION

Implementations of the present invention provide systems, methods, and apparatus configured to convert kinetic energy of lower head flowing water into power. In particular, one or more implementations of the present invention include a linear hydro-kinetic power generation system including a linear electric power generation subsystem. The hydro-kinetic power generation system includes paddles that drive the linear electric power generation subsystem. Additionally, implementations of the present invention can be easily configured for a variety of installations.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

The invention is a linear hydro-kinetic power generation system configured to generate power using low-head flowing water. It comprises multiple of paddle subassemblies, a suspension mechanism for maintaining the system stationary with respect to the moving water and at an appropriate depth, a conveyance system configured to route the paddles in an elongated continuous loop, and a linear electric power generation subsystem. The linear electric power generation subsystem may have electric coils and one or more magnets. The system is implemented such translation of the paddle subassemblies along the conveyance system causes magnetic members to pass by electric coils, thereby inducing current. The linear electric power generation subsystem may incorporate one or more rotary electric generator elements. The conveyance system may comprises a belt and one or more pulleys and the paddle blades may be generally flat or curved. The paddle subassemblies may include a paddle blade manipulation mechanism configured such that the paddles are positioned at a retracted angle during the return trip in the elongated continuous loop. The paddle subassemblies may also include a paddle blade manipulation mechanism that is actively driven in angle around one or more axes such that the paddle blades may be oriented at any advantageous angle.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE EMBODIMENTS

The present invention is directed toward systems, methods, and apparatus configured to convert kinetic energy of lower head flowing water into power. In particular, one or more implementations of the present invention include a linear hydro-kinetic power generation system including a linear electric power generation subsystem. The hydro-kinetic power generation system includes paddles that drive the linear electric power generation subsystem. Additionally, implementations of the present invention can be easily configured for a variety of installations.

Figure 1:
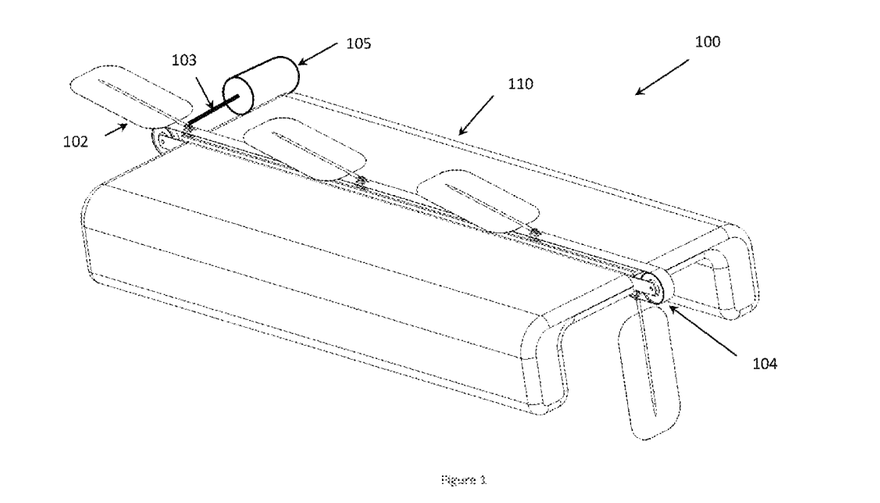
FIG. 1 illustrates a perspective view of an example linear hydro-kinetic power generation system.
Figure 2:
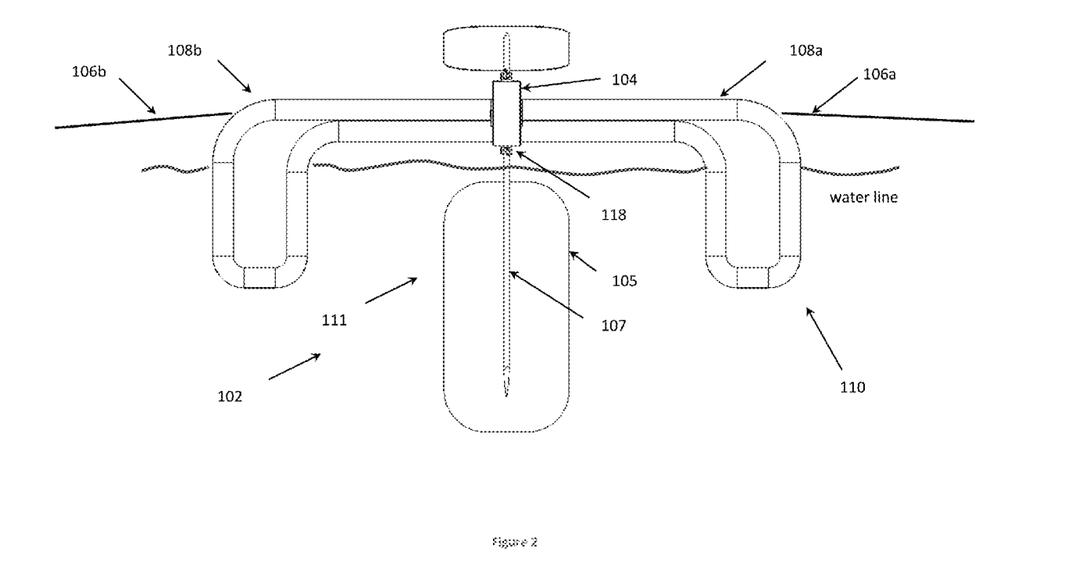
FIG. 2 illustrates an end view of the example linear hydro-kinetic power generation system of FIG. 1.

For example, FIG. 1 is an isometric view of a linear hydro-kinetic power generation system 100 and FIG. 2 is an end view of the system. The linear hydro-kinetic power generation system 100 can be used to convert kinetic energy of the low-head flowing water into electric or mechanical power. One will appreciate in light of the disclosure herein that one or more implementations of the linear hydro-kinetic power generation system 100 can be low cost, yet effective for generating power using low-head flowing water.

As part of the linear hydro-kinetic power generation system 100, FIG. 1 illustrates how the system can include a paddle assembly 102 for capturing the kinetic energy of the water source. The linear hydro-kinetic power generation system 100 can also include a linear electric power generation subsystem 104 for converting the kinetic energy captured by the paddle assembly 102 into electric power. Furthermore, the example linear hydro-kinetic power generation system 100 can include a suspension mechanism 110 for ensuring that the linear hydro-kinetic power generation system 100 is maintained stationary in the water at an appropriate depth.

Figure 3:
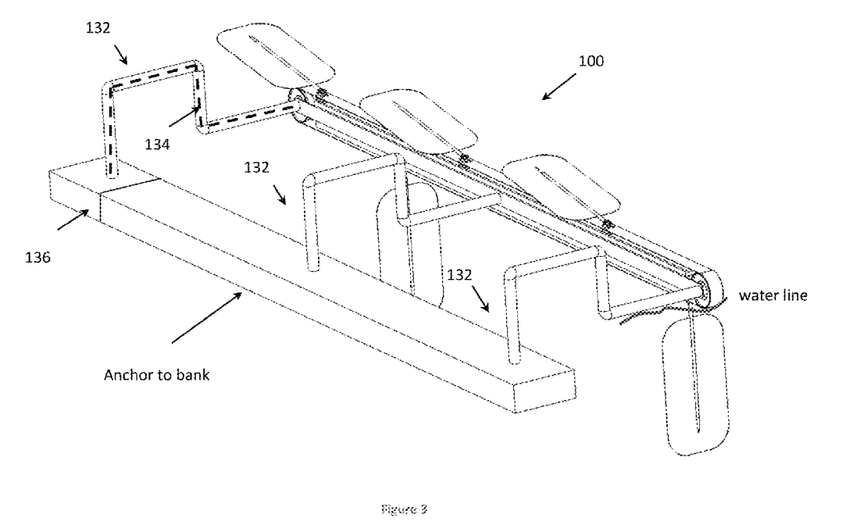
FIG. 3 illustrates a perspective view of another example linear hydro-kinetic power generation system having an alternative suspension mechanism.

For example, FIG. 2 illustrates that the suspension mechanism 110 can comprise one or more floats 108*a*, 108*b* and one or more guy wires 106*a*, 106*b*. The floats 108*a*, 108*b* can maintain the linear hydro-kinetic power generation system 100 in the water at an appropriate depth. The guy wires 106*a* and 106*b* can be anchored to the bank, side wall, or bottom of the water way. The depth is to be set such that the linear electric generation hardware is kept generally out of the water and not subject to the corrosive and erosive effects of the flowing water. The paddles should still be fully submerged because any paddle material out of the water would not contribute to energy capture. The floats 108*a*, 108*b* can comprise a polymer or other suitable material that allows the floats to create sufficient buoyancy to support the linear hydro-kinetic power generation system 100. FIG. 3 shows an alternate embodiment where structural supports 132 are attached to one or both watercourse banks and cantilevered out to an appropriate housing for the linear electric generator. Yet another embodiment might use moorings or anchors from the base of the channel to place the system. The adaptability of system placement is an advantage of the invention.

Referring now to FIG. 2 the paddle assembly 102 will be described in greater detail. The paddle assembly 102 can comprise a plurality of paddle subassemblies 111—see also FIG. 4 for a side view. Each paddle subassembly 111 can comprise a generally flat portion 105 which will be called the blade or paddle blade that captures the kinetic energy of the water and a paddle handle 107. The paddle handle 107 attaches to or is an integral piece with the blade 105 on one end and connects to the paddle manipulation mechanism 118 on the other end in a manner that will be described in detail for example embodiments later. The blade can be generally flat to minimize cost of materials and cost of forming. Curved or cupped blades to create more drag in the water can also be a part of the design. The size of the blade varies with the size of the flowing watercourse and amount of energy that will be extracted. For small stream and canal flows, the width and height of the blade may be from 15 to 150 cm. The thickness may be from 0.2 to approximately 1 cm for such flows. For large low head river flows and tidal driven flows the limits will be driven by practical handling concerns and not the size of the flow. The width and height of the blades for these may range from 140 cm to the 100 m range especially since multiple paddle blade portions may be welded or fastened together. In the example embodiment depicted in FIG. 2, the paddle handles 107 should be only long enough so that the top of the paddles is about 5-20 cm below the water surface. An objective is to create cost effective paddles that can be spaced over a long length of flowing water. This increases the energy available for capture (without requiring dams or civil engineering works). Therefore the paddle subassemblies should be made of low cost materials and formed by low cost forming methods. Materials may include polymers, corrosion resistant steels, brass or others. Forming methods include stamping, molding, casting, punching, extruding, welding or combinations thereof.

Figure 4:
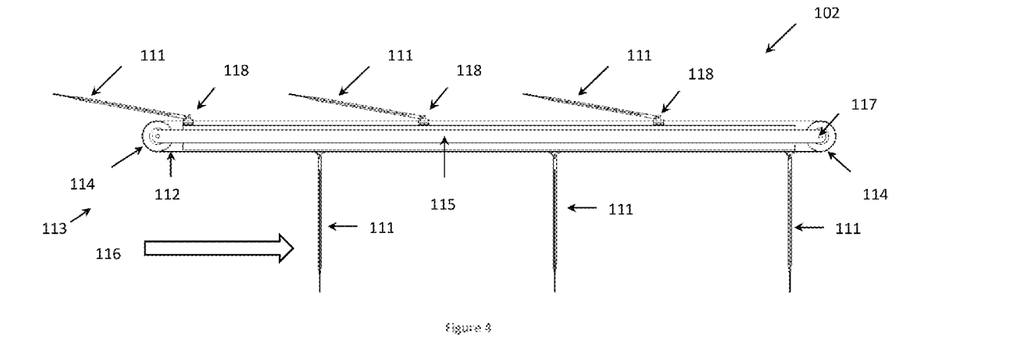
FIG. 4 illustrates a side view of various components of the example linear hydro-kinetic power generation system of FIG. 1.

Referring to FIG. 4 for an example embodiment, the paddle subassemblies 111 are secured to a conveyance system 113 via the paddle manipulation mechanisms 118. The conveyance system 113 can comprise a belt 112 and pulleys 114. In the example the pulleys are located at the ends of the hydro-kinetic system, but the system may be designed with pulleys at the ends, in the middle or otherwise interspersed along the length as required to promote a smooth, accurate motion of the paddle subassemblies 111. The belt 112 and pulleys 114 can allow the paddle subassemblies 111 to follow an elongated continuous loop. The belt can be made of rubber, polymers, metallic elements or some combination thereof. For example a rubber belt with wire or foil reinforcing metallic material can result in a strong but pliable belt for smooth conveyance. The pulley radii are sized to move the combination of the belt and paddle manipulation parts accurately along the length of the system. The pulleys 114 are attached to a long channeled structural member 115 via axles 117 by a pinned or captured method.

Via the conveyance system 113, the flowing water (indicated by arrow 116) can cause the paddle subassemblies 111 of the paddle assembly 102 to move along the length of the linear hydro-kinetic power generation system. The belt 112 and end pulleys 114 return the paddles along the top of the linear hydro-kinetic power generation system to an origin point of the cycle. Thus, the paddles subassemblies 111 can follow an elongated linear like continuous loop. The belt 112 and pulleys 114 can convey the paddle subassemblies 111 efficiently at a minimum cost and frictional loss to the linear hydro-kinetic power generation system 100. Referring to FIG. 1, the paddle subassembly and conveyance mechanisms described in the example embodiment allow movement within the paddle assembly 102 along the length of the linear hydro-kinetic power generation system which can activate the linear electric power generation subsystem 104 to generate power. In alternate embodiments one or more rotary electric power generation units 105 can be incorporated in the elongated linear hydro-kinetic power generation system. These can be in addition to or in place of the linear electric generator subsystem 104. For example rotary electric generators could be attached by a shaft 103 to axles of the pulleys 114 that are described as part of the example conveyance system.

One will appreciate in light of the disclosure herein that the configuration of the paddle assembly 102 can provide a number of advantages. For example, in contrast to other linear electric power generation systems which run on reciprocating linear motion, the linear hydro-kinetic power generation system is continuous. Thus, there is no energy loss due to the stopping and restarting associated with a reciprocating linear motion. Furthermore, in contrast to non-elongated rotary wheel hydro power capturing systems, embodiments of the linear hydro-kinetic power generation system can be configured such that at least about half of all of the paddle subassemblies 111 are always actively capturing power from the water source.

Additionally, the relatively long run of the linear hydro-kinetic power generation system 100 can allow for efficient capture of power from the low-head flowing water. The linear hydro-kinetic power generation system 100 shown in FIGS. 1 and 4 includes six paddle subassemblies 111. In alternative implementations, the number of paddle subassemblies 111 can be increased or reduced to maximize the efficiency of the linear hydro-kinetic power generation system 100. Additionally, various runs of paddle subassemblies 111 can be connected together to span the width of a water source to further maximize the efficiency of power captured from the water source.

In most hydro-power generation configurations, it is a goal for 100% of the available water to be routed through the power generation area (usually a turbine) because this maximizes output power. For the linear hydro-kinetic system 100, this is not the case and the explanation will give further methodology for sizing the paddles and linear generator. If a paddle blade blocked the entire channel, there would be no way for the water to also flow and thereby provide an opportunity for energy capture. In a channel flow the blockage ratio may be defined as the ratio of the cross sectional area of the structure in the flow to the cross sectional area of the flow. For the linear hydro-kinetic system the blockage ratio should stay in the range of 40-80%. For large watercourses where for some reason it was not desired or practical to use larger systems the blockage ratio could go lower than 40%, for example from 1%-40%. With the blockage ratio in these ranges some energy is kept by the water flowing faster than and around the paddles—but this is necessary for the flow not to back up behind the structure and overflow its banks. The energy may be exchanged in the water further downstream and captured in part by a more downstream paddle. Whether designing one paddle assembly or configuring for multiple linear hydro-kinetic systems to be deployed in a single water way, the blockage ratio ranges provide guidelines to help determine paddle blade geometry. Another advantage of not exceeding 80% blockage ratio is that fish are freer to move around the structure. Because of the openness of the system and large water space between paddle blades the linear hydro-kinetic system 100 is expected to be fish friendlier than other hydraulic options.

Figure 5:
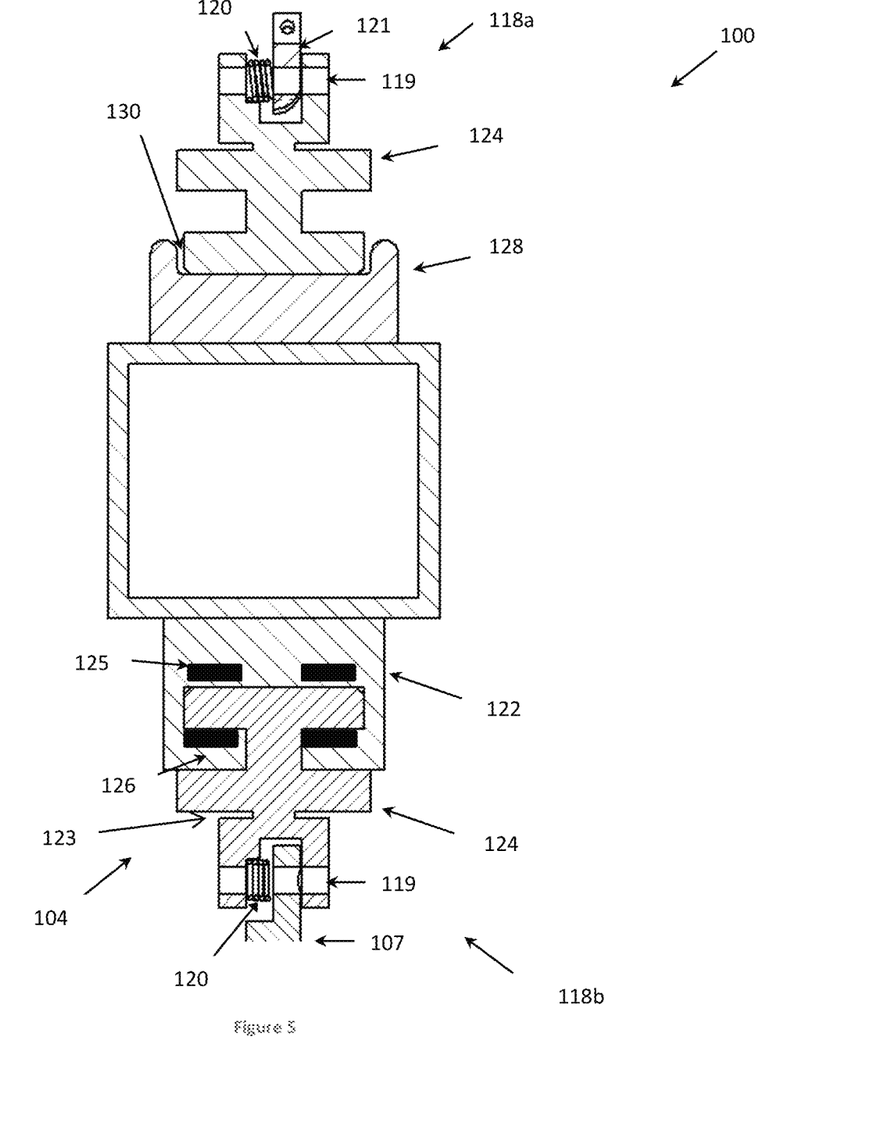
FIG. 5 illustrates a cross section view of various components of the example linear hydro-kinetic power generation system of FIG. 1.

Referring now to FIG. 5, a cross section view of various components of the example linear hydro-kinetic power generation system 100 is shown. FIG. 5 illustrates that in the example, the paddle blade manipulation mechanism 118(*a* or *b*) can comprise an axle 119, a base 124, a torsion spring 120, and one or more stops 121. The paddle blade manipulation mechanism 118 governs the angle of attack for the paddle blades. In the example it can orient the paddle blades essentially normal to the flow or at any angle to the flow while the blades are in the water and capturing power. When the blades are out of the water and returning to an origin via the conveyance system, the paddle blade manipulation mechanism 118 can bias the blades to lay nearly flat. By having the blades 105 lay nearly flat during the return trip across the top of the linear hydro-kinetic power generation system 100, drag forces through the air are minimized.

The lower portion of FIG. 5 illustrates that the paddle handles 107 can be secured to the manipulation mechanism with a pinned axle through the paddle handle—or captured bearing assemblies can be press fit into the paddle handle. Indeed many mechanical methods could be used as long as a rotational movement of the paddle assemblies around an axis perpendicular to the flow direction is permitted. The axle or rotating bearing may be made of steel or other structural materials.

The paddle manipulation mechanism 118 has a base 124 that is attached to the belt of the conveyance system 112—not shown in FIG. 5, but an area for attaching is identified by arrow 123. In the example, the base 124 can be attached to the belt by bolting, riveting, a press or crimp fit or others and may be made of steel, aluminum, bronze, polymers or other suitable materials. The base 124 is attached to an electric power generation member that will be described in detail later. For example the base and electric power generation member may be a one piece construction that has a T-shaped protrusion, or multiple pieces may be bolted or otherwise fastened together. The torsion spring 120 can bias the blades 105 to a very low angle when there is little or no water force on the blade 110. For the example in FIG. 5, one end of the torsion spring 120 fits into a cavity in the rotating member (part of the paddle handle 107), the other end of the torsion spring is held in place in a cavity on the base 124 side. In the example the axle 119 passes through the middle of the torsion spring 120. Thus the torsion spring 120 exerts a biasing force that in the absence of water pressure will force the paddle blades to a flat position. The torsion spring force is sized in proportion to the relative water velocity squared (relative water velocity equals average water velocity minus paddle velocity) and the area of the paddle. For example, for a 2.3 m^2 paddle area and a relative velocity of 0.5 m/s, the torsion spring may have a force of 20-50 Newtons. For larger or smaller systems with larger or smaller paddle areas and water velocities, the torsion springs may have different ranges such as from 0-25 Newtons, from 50-150 Newtons or from 140 Newtons to more than 2000 Newtons. A torsion spring having a suitable combination of force and spring length can be selected from manufacturer's catalogs for such springs and this will fix all spring dimensions. When a paddle blade 105 enters the water, the momentum force of the flowing water can overcome the biasing force created by the torsion spring 120. Thus, the momentum force of the flowing water can force the paddle blade 105 to a fixed position corresponding to approximately 90 degrees relative to the water flow (see FIG. 4). The torsion spring may be made of spring steel or suitable spring materials.

Referring to the upper portion of FIG. 5, to ensure that the blades 105 can be properly oriented, the exemplary paddle blade manipulation mechanism 118 includes a stop or stops 121 configured to restrict the paddle handle 107 or paddle blade 105 from over or under rotating. The stops are formed protrusions from the base 124 and/or the paddle handles 107 that impede motion and confine the range of angular motion, for example from 0 degrees to 90 degrees. In the example, 0 degrees represents paddle blades laid flat and 90 degrees represents paddle blades normal to the flow of water. The stops can be configured for any practical range of angles such as from 1-5 degrees to 90-120 degrees or 0-360 degrees. The low part count and simplicity of the exemplary paddle blade manipulation mechanism 118 can provide a cost effective solution.

Figure 6:
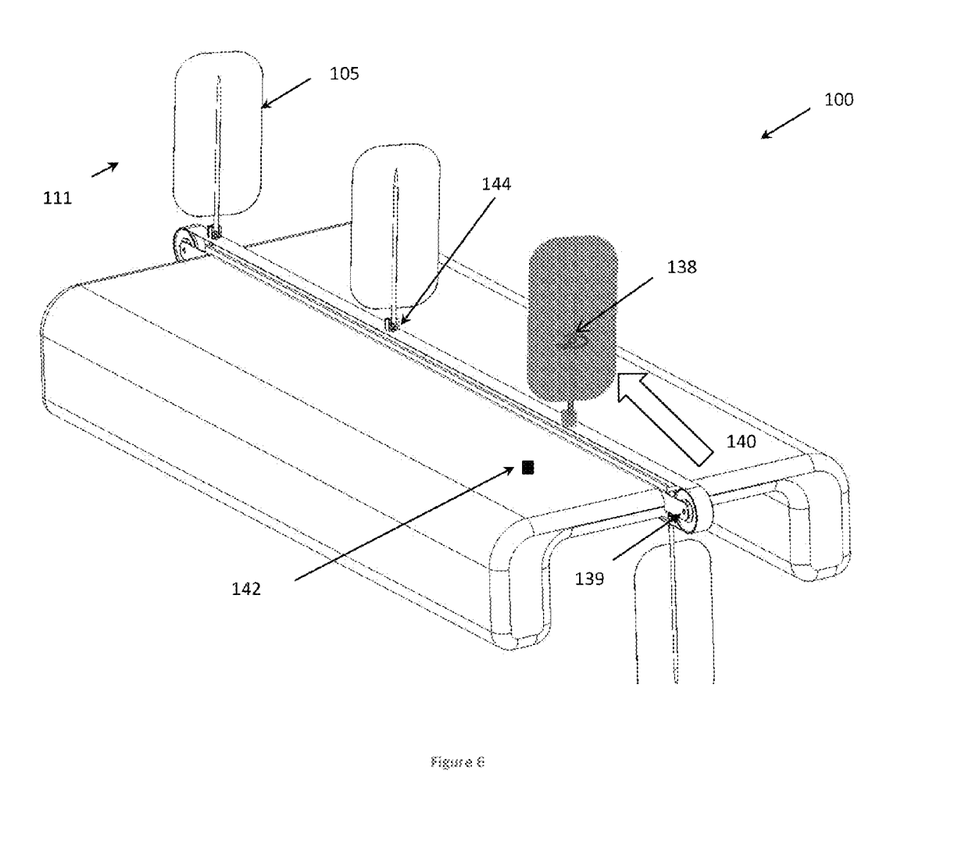
FIG. 6 illustrates an isometric view of another example linear hydro-kinetic power generation system having a two axis paddle blade manipulation mechanism being configured for combined wind and water power generation.

In alternative implementations, the paddle subassemblies 111 may not include a paddle blade manipulation mechanism 118 or there may be a more sophisticated mechanism. For example FIG. 6 refers to situations in which wind indicated by arrow 140 would be favorable to overcoming frictional losses and generating power during the paddle return trip. In this example, a wind sensor 142 could detect wind direction and communicate with so as to govern one or more active actuators 144 such as a servo motor driven rotary positioner. This allows two-axis actuation (one axis indicated by arrow 139 that is parallel to the pulley axle and one twisting angle axis indicated by arrow 138). If the sensor indicates favorable wind, the paddle blades 105 can then be positioned to remain upright and act as sails to capture power from the wind. Thus, in one or more implementations the linear hydro-kinetic power generation system 100 can take advantage of favorable wind as a combined wind/water kinetic power capture device.

Figure 7:
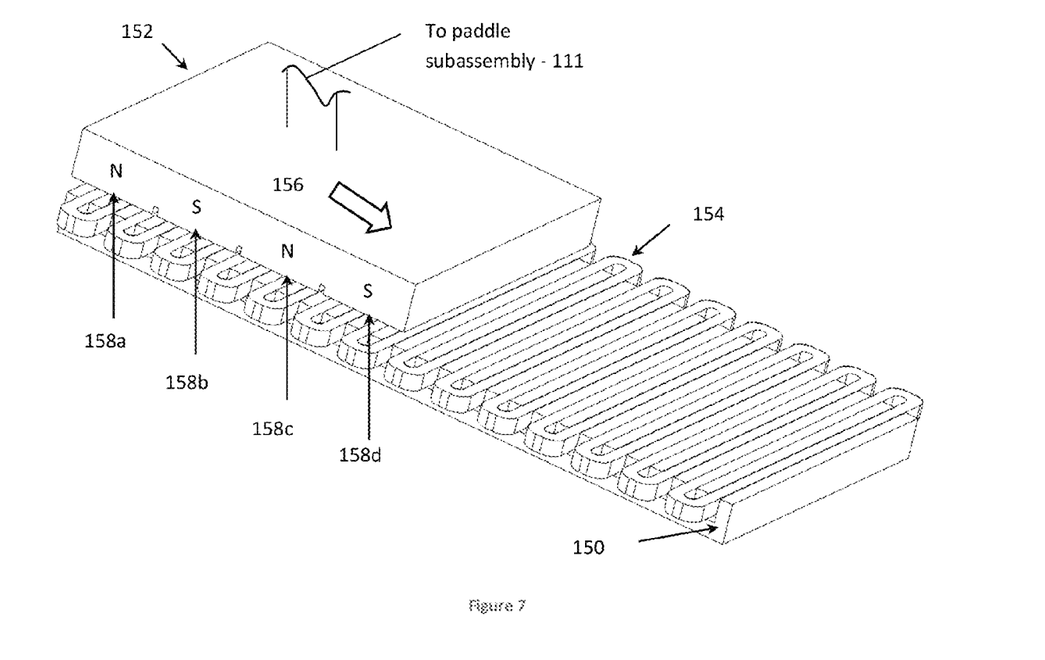
FIG. 7 illustrates an isometric view of an example linear electric power generation system demonstrating the principles of inductive power generation

FIG. 7 illustrates an example depicting the principle of electrical power generation for the linear electric power generation subsystem 104 from FIG. 1. The linear hydro-kinetic generation system is not limited to linear generation elements only and can incorporate standard rotary motion electric generators such as connected to the pulley axles. FIG. 7 represents a somewhat inverted view relative to other figures in that the paddle subassemblies 111 would be above rather than below the mover yoke designated 152 as indicated. In this example, a linear electric generator can comprise one or more mover yokes 152, a stator yoke 150, and one or more coils 154. In the example the mover yoke 152 comprises a structure including permanent magnets or electromagnets such that there are two or more magnetic poles (158a though 158d) acting in the mover. The stator yoke 150 comprises a slotted structure that can accommodate the coils 154. The coils can be made of an electrically conductive material such as copper wire or other conducting wire or laminate conducting material. Per Faraday's law of induction, when the mover yoke 152 translates with respect to the stator yoke 150 and coils 154, a current is induced in the coils. The translation direction is indicated by arrow 156. In the example, as the magnetic flux associated with the alternate north and south poles of the mover yoke 152 cut across the coils 154, a natural commutation creating an alternating current is realized. The coils may be electrically connected together in various arrangements including series, parallel, or combinations of series and parallel. One will appreciate that many configurations are possible such as slotted or slotless stator yokes, excited electromagnets either on the mover yoke, stator yoke or both; and various configurations of electrical power phases. There are also multiple options for commutation to achieve direct current (DC) or one or more phase alternating current (AC) electrical output. The linear hydro-kinetic power generation system 100 in FIG. 1 may incorporate any of these configurations for use in the linear electric generation subsystem 104 and references are included herein describing a variety of these configurations.

Referring again to FIG. 5, one finds a cross section, view which further illustrates details of the exemplary linear electric power generation subsystem 104. In particular, the linear electric power generation subsystem 104 can include a channeled stator yoke 122 and a slide member 124. The channeled stator yoke 122 may be formed to incorporate slots to which electrical conductor coils 125 are wound. It also serves to couple the magnetic flux into the electrical conductor coil sets. The channeled stator yoke may be made of ferrous steel, iron, non-ferrous material or other materials. The channeled stator yoke 122 can extend substantially the length of the linear hydro-kinetic power generation system 100 between the pulleys 114 (FIG. 3). The slide member 124 can be sized and configured to fit within a slot of the channeled stator yoke 122. As an example of a slot configuration, the channeled stator yoke 122 can include a T-shaped slot, and the slide member 124 can include a T-shaped protrusion. A T-shaped slot may be advantageous in that it can be configured so that multiple parts of the magnetic flux paths from a permanent magnet mover similar to the one depicted in FIG. 7 (152), cut across multiple coils 125 (4 sets of coils in the example). This promotes high power generation in a comparatively smaller generator.

In one implementation, electric coils can be positioned in arms 126 of the channeled stator yoke 122 and extend along the length of the channeled stator yoke 122. In other embodiments the channel could have other shapes without arms or there could be no channel. In implementations, the protrusion of the slide member 124 can include one or more permanent magnets or can include switched reluctance electromagnets. The permanent magnets can be made of materials such as rare earth magnets, neodymium diboride, aluminum nickel cobalt, or others. It can be made as a multi-part composite material having pieces of permanent magnet material combined with other materials such as polymers. Thus, water acting on the paddle subassemblies 111 can cause an attached slide member 124 to translate along the channeled stator yoke 122. As the magnetic mover yokes 152 attached to each paddle move across the coils 154 positioned in the channeled stator yoke 122, current is induced in the coils and electricity is generated. The generated electricity can then be collected, stored, and distributed using a power harness connected to the linear hydro-kinetic power generation system 100.

In alternative implementations, the slide members 124 can include coils and the channeled stator yoke 122 can include magnets. In this implementation the electricity capturing coils are the moving members making the collection and redistribution difficult, probably requiring commutators such as brushes or contactors. In yet another implementation, one can use commutators or an inductive excitation to create a leading or lagging magnetic field in the slide members—thus avoiding the need for permanent magnets. This class of electromagnetic generators may be known as self-excited or switched reluctance machines and linear varieties are taught in U.S. Pat. No. 4,369,383 to Lawrence Langley 1983, which is hereby incorporated by reference herein. Linear electric generators can also be configured to generate direct current (DC) electric power or single or multiple phase alternating current (AC) outputs as disclosed in Boldea and Nasar, "Permanent-Magnet Linear Alternators Part 1: Fundamental Equations" IEEE TRANSACTIONS ON AEROSPACE AND ELECTRONIC SYSTEMS, Vol. AES-23, No. 1, pp. 73-78, 1986. Thus, one will appreciate that the linear electric power generation subsystem 104 can be constructed in a variety of different ways. Thus, the present invention is not limited to any depicted implementation.

The electromagnetic force that is resistive to motion governs how much electricity will be generated in the linear electric generator. The coil sizes, magnetic structure sizes and selection and dimensions of the linear generator can be derived knowing this force according to Trumper, Kim, and Williams, "Design and analysis framework for linear permanent-magnet machines," Industry Applications, IEEE Transactions on, vol. 32, no. 2, pp. 371-379, March/April 1996. The total force adding this resistive force and the frictional loss forces is to be sized such that the paddle velocity is expected to be between about one third and one half of the water velocity for maximum power generation. The frictional loss forces would be expected to be much smaller than the electromagnetic forces and may be estimated to a first order using Newton's equations for friction. For example, the force of friction equals the product of any force orthogonal to the direction of motion and a coefficient of static friction μs that can be estimated given the materials chosen. As such, a formulation for sizing the system depending on the flow parameters (water velocity and sizes of the flow channel) has been disclosed herein.

Thus in an example embodiment depicted in FIG. 5, when a paddle subassembly 111 is in the water, the slide member 124 can travel along the channeled stator yoke 122. On the return trip the slide member 124 can travel along a guide 128. The pulley 114, belt 112, and slide member 124 can be designed with a small mechanical clearance so that after a paddle assembly turns into the water around a pulley 114, the T-shaped protrusion of the slide member 124 will clear and be guided down the slot in the channeled stator yoke 122. As shown, the guide 128 can each include a groove 130 allowing it to accommodate the motion while maintaining slide member coupling to the belt 112 (see FIG. 5).

Figure 8:
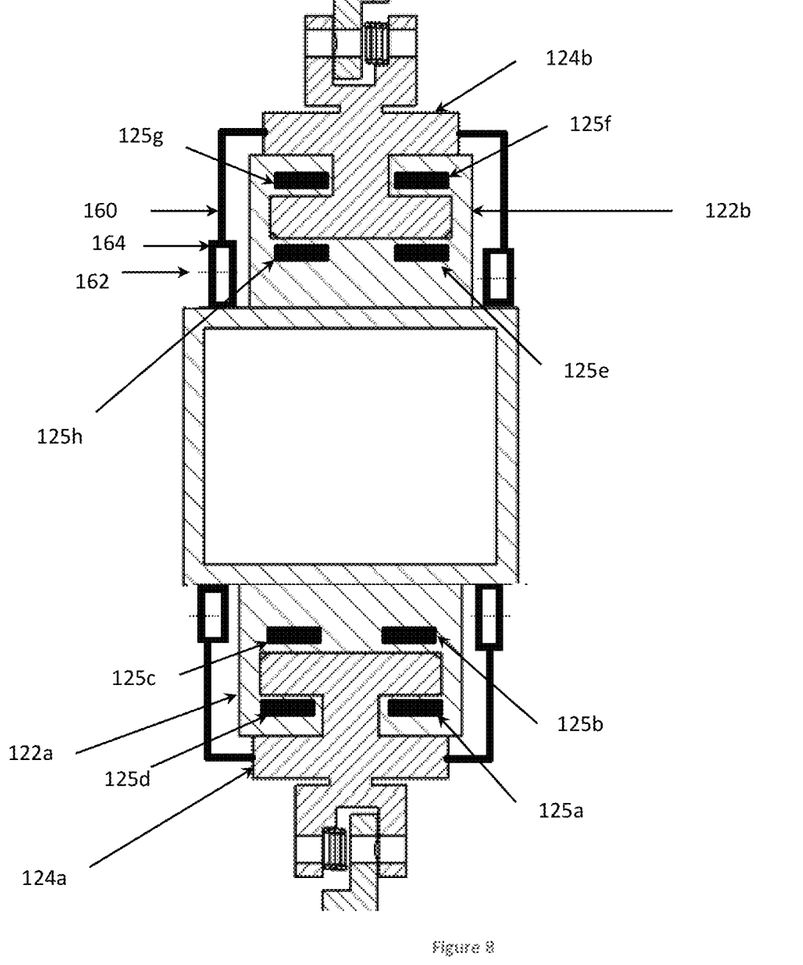
FIG. 8 illustrates a cross section view of various components of an example linear hydro-kinetic power generation system having wheels as part of the conveyance subsystem.

In one or more alternate implementations as depicted in FIG. 8, the linear hydro-kinetic power generation system 100 may not include a guide member 128. In its place the linear hydro-kinetic power generation system 100 can include an additional channeled stator yoke 122b. In such implementations the magnets of the moving members 124a, 124b can induce current in coil sets 125a-d in the lower channeled stator yoke 122a on one leg of the continuous cycle, and current in coil sets 125e-h in an upper channeled stator yoke 122b during the return trip. FIG. 8 also depicts an alternate implementation to avoid sliding members. In this implementation all protrusion and slots have ample clearance. The moving members are guided by brackets 160 to which are applied axles 162 and around which turn wheels 164. Wheeled configurations may be advantageous for reducing frictional resistance to the linear motion.

Table 1 summarizes the parts and computed expected performance for assemble-able exemplary power generation systems.

TABLE 1

| Design Element | Value |
| --- | --- |
| Length | 50 m-100 m |
| Output power | 40-100 kW |
| Canal bottom slope | 1 m-3 m per 350 m length |
| Elevation drop over system | .5-1.1 m |
| Flow width | 1-4.5 m |
| Typical flow depth | 1-3 m |
| Number of paddle subassemblies | 8-24 |
| Paddle blade width | About 3 m |
| Paddle blade height | About 1.9 m |
| Blockage ratio | About 63% |
| Structural member square cross section | About .1 m |
| Structural member thickness | About 2.5 mm |
| Torsion spring force | 100-250 Newtons |
| Suitable Torsion spring part number | TS1100-90-182115-R from MSD spring |
| Stop angles | 3° and 90° |
| Stator yoke cross section dimensions | About .1 by .077 m |
| Stator yoke material | Ferrous steel |
| Mover yoke - T protrusion | Material: Aluminum nickel cobalt permanent magnet with Teflon coating |
| Linear electric generator configuration | Single phase synchronous AC |
| Coils | Stranded AWG 4 gauge copper wire |
| Wiring of coils | series |
| Operating voltage, current | 240-440 Volts, 50-200 amps |
| Harness to grid type | S.O. 2-4 gauge cord - with conduit and supported/routed via a cantilever arm |
| Anchoring method | Cantilever arms - welded stainless steel tubing |
| Grid interface | 113430-000-00 AC/DC rectifier from Casey equipment, GT100-480 DC grid tie inverter from Xantrex |

The invention is advantageous relative to many other approaches because it can be scaled up or down easily by adjusting the paddle sizes and length of the system. Therefore the potential embodiments and range of use can be broad. One good example of use for the invention is power generation in a tranquil irrigation canal. Such canals are common and currently hydropower is not extracted from them due to the low head nature of the structures. However, their use for human irrigation purposes implies good access, usually straight runs and well characterized velocities for optimizing designs. Typically it would be reasonable to assume there are electrical grid resources nearby these canals. The invention is floated in the canal per FIG. 1 or hard mounted to the canal embankment per FIG. 5.

In embodiments, the output power can be routed to a use site i.e. an electrical load or grid interface point (see FIG. 3). This routing is to be accomplished by an electric conductor harness 134 running from the system 100 to the load or grid interface point 136. The harness can be routed along or within cantilever supports or guy wires in example embodiments or a protective conduit can be made for the purpose of harness routing. Harness wire size and type and conduit choices can be derived from governmental electric codes such as the United States National Electric Code (NEC).

In embodiments requiring an interface to the electrical grid, several choices are suitable. The functional objective is to supply power of grid quality in terms of voltage and phase and to include fail safes such that the power can be disconnected from the grid in the event of a fault. One alternative is an electronic load governor, such as are currently employed in various hydropower installations. Another alternative would be to configure the linear electric generator for DC output or to use a rectifier and then add a grid tie inverter. The options may be implemented with or without the use of electrical energy storage. Schematically in FIG. 3, box 136 represents a grid interface electronics assembly. This assembly can comprise any of the embodiments listed herein by which electrical power can be sourced to the grid or a load or it may comprise any other such interface to a load or grid such as are commercially available.

The simplicity of installation and flexibility of deployment of the invention are major features.

The present invention may thus be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A linear hydro-kinetic power generation system for converting kinetic energy of a moving fluid into electric or mechanical power comprising:
    a suspension mechanism for ensuring that the linear hydro-kinetic power generation system is maintained stationary in the moving fluid at an appropriate depth;
    a plurality of paddle subassemblies are supported by the suspension mechanism for capturing the kinetic energy of the moving fluid; each paddle subassembly comprises a paddle blade attaches to a paddle handle;
    a linear electric power generation subsystem is supported by the suspension mechanism for converting the kinetic energy captured by the plurality of paddle subassemblies into electric power;
    a conveyance system is supported by the suspension mechanism for routing the paddle subassemblies in an elongated continuous loop when the moving fluid causes the paddle subassemblies to move along the length of the linear hydro-kinetic power generation system; and a paddle blade manipulation mechanism comprising manipulation/rotation of the paddles in one or more axes of rotation;

wherein the paddle handle attaches to the conveyance system via the paddle blade manipulation mechanism;

wherein the paddle blade manipulation mechanism is configured to bias the paddle blades into a retracted position when the paddle blades essentially parallel to the flow during a return trip along the conveyance system;

wherein the linear electric power generation subsystem includes one or more electric coils and one or more magnets, wherein translation of the plurality of paddles subassemblies along the conveyance system causes the magnets to pass by the electric coils accommodated in a stator yoke, thereby inducing current and electricity is generated;

wherein the linear electric power generation subsystem comprises from zero to multiple rotary electric generation elements in combination with one or more linear electric generator;

wherein the determination of an appropriate electromotive resistance force for the linear electric power generation subsystem is based upon maintaining a paddle blade speed through the moving fluid at approximately one third to one half of an average moving fluid speed.

2. The linear hydro-kinetic power generation system as recited in claim 1, wherein the conveyance system comprises a belt and one or more pulleys.

3. The linear hydro-kinetic power generation system as recited in claim 1, wherein each paddle blade has a generally flat shape or a curved shape allowing for curvature in two dimensions up to and including hollow hemispherically shaped paddle blades.

4. The linear hydro-kinetic power generation system as recited in claim 1, wherein the suspension mechanism comprises one or more floats and one or more guy wires.

5. The linear hydro-kinetic power generation system as recited in claim 1, wherein the suspension mechanism comprises anchoring structures affixed to the water course bank, sides or bottom.

6. The linear hydro-kinetic power generation system as recited in claim 1, wherein the paddle blade manipulation mechanism comprises a torsion spring.

7. The linear hydro-kinetic power generation system of claim 1 wherein the moving fluid from which energy is drawn comprises water or water and wind.

8. A method for designing a linear hydro-kinetic power generation system for converting kinetic energy of a moving fluid into electric or mechanical power comprising:

anchoring the linear hydro-kinetic power generation system in the moving fluid at an appropriate depth by a suspension mechanism;

attaching a plurality of paddle subassemblies to the suspension mechanism for capturing the kinetic energy of the moving fluid; each paddle subassembly comprises a paddle blade attaches to a paddle handle;

estimating a size for the paddle blade relative to the fluid way cross section;

attaching a linear electric power generation subsystem to the suspension mechanism for converting the kinetic energy captured by the plurality of paddle subassemblies into electric power;

attaching a conveyance system to the suspension mechanism for routing the paddle subassemblies in an elongated continuous loop when the moving fluid causes the paddle subassemblies to move along the length of the linear hydro-kinetic power generation system;

attached the paddle handle to the conveyance system via a paddle blade manipulation mechanism; wherein the paddle blade manipulation mechanism comprising manipulation/rotation of the paddles in one or more axes of rotation;

determining appropriate electromotive resistance force for the linear electric power generation subsystem, and sizing the remaining components of the linear hydro-kinetic power generation system for efficient operation;

wherein the determination of the appropriate electromotive resistance force is based upon maintaining the paddle blade speed through the moving fluid at approximately one third to one half of the average moving fluid speed;

wherein the paddle blade manipulation mechanism is configured to bias the paddle blades into a retracted position when the paddle blades essentially parallel to the flow during a return trip along the conveyance system;

wherein the linear electric power generation subsystem includes one or more electric coils and one or more magnets, wherein translation of the plurality of paddles subassemblies along the conveyance system causes the magnets to pass by the electric coils accommodated in a stator yoke, thereby inducing current and electricity is generated;

wherein the linear electric power generation subsystem comprises from zero to multiple rotary electric generation elements in combination with one or more linear electric generator.

* * * * *